UNITED STATES PATENT OFFICE.

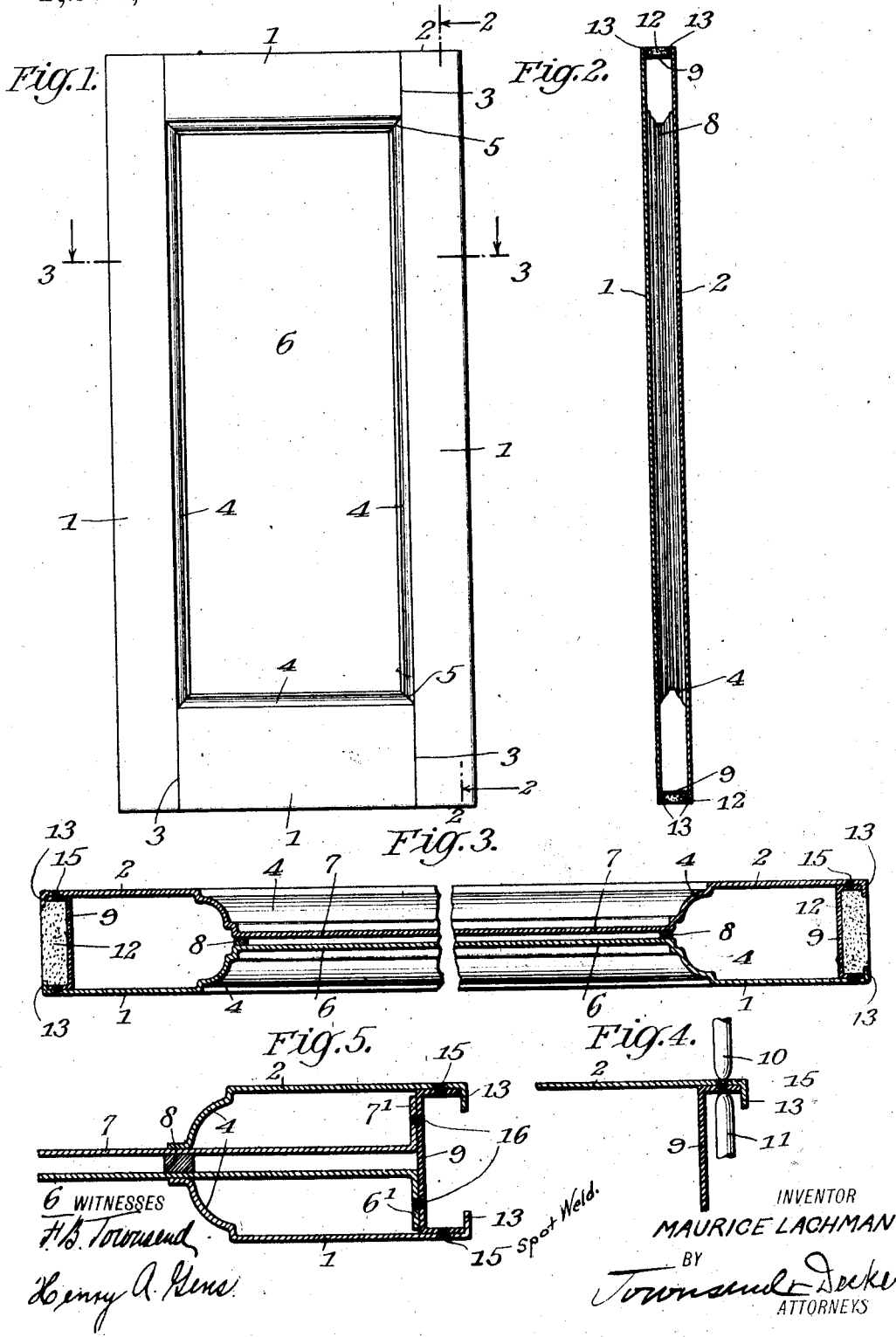
M. LACHMAN.
SHEET METAL DOOR CONSTRUCTION.
APPLICATION FILED OCT. 29, 1913.
1,203,208.  Patented Oct. 31, 1916.
INVENTOR
MAURICE LACHMAN.

MAURICE LACHMAN, OF NEW YORK, N. Y.

SHEET-METAL DOOR CONSTRUCTION.

1,203,208.   Specification of Letters Patent.   Patented Oct. 31, 1916.

Application filed October 29, 1913. Serial No. 797,921.

*To all whom it may concern:*

Be it known that I, MAURICE LACHMAN, a citizen of the United States, and a resident of New York, in the county of New York and State of New York, have invented certain new and useful Improvements in Sheet-Metal Door Construction, of which the following is a specification.

My present invention relates to sheet metal constructions such as doors, frames or the like and particularly relates to the manner of joining the two faces of the construction to each other to complete the structure.

The object of the invention is to simplify and cheapen the construction of sheet metal doors and frames and thereby increase the use of such structures.

The invention consists in the improved construction hereinafter more particularly described and then specified in the claims.

In the accompanying drawings, the invention is shown in its preferred form as applied to the construction of a sheet metal door but it will be understood that this use of the same is for the purposes of illustration only.

Figure 1 is a front elevation of a sheet metal door embodying the present invention. Fig. 2 is a vertical cross-section taken on the line 2, 2 Fig. 1. Fig. 3 is a horizontal cross-section on an enlarged scale and taken on the line 3, 3 Fig. 1. Fig. 4 is a fragmentary section of one corner of the construction and illustrates diagrammatically the welding electrodes preferably used to join the sections together. Fig. 5 is an enlarged cross-section through a stile member illustrating a modification of the invention.

1 and 2 indicate the front and rear face or stile plates of the door or frame. The door or frame as is usual is provided with side and end stile members which are secured to each other along the meeting edges 3 in any desired manner as by soldering, brazing or other means well known in the art.

The stile plates 1 and 2 may be provided with moldings 4 in any desired manner either integral or otherwise and are mitered at the corners as at 5. Panel plates 6, 7 spaced apart by blocks or strips 8 are preferably provided for each stile plate respectively. The manner of joining the stile plates and the panel plates forms no part of the present invention and further description will be dispensed with except to point out that preferably each face of the door or frame is complete in itself and to complete the structure it is merely necessary to join the outer free edges of the stile plates 1 and 2.

9 indicates a sheet metal spacing strip preferably U-shaped in cross-section. The strip 9 is inserted between the stile plates 1 and 2 with the sides or legs of the strip bearing against the inner surfaces of the plates at or near the free edges. As indicated in Fig. 4 the side of the U-shaped strip 9 and the stile plate are brought together between current supplying electrodes 10 and 11 and upon the passage of an electric current from one electrode to the other and the application of pressure the parts are welded together as is now well understood in the art. By the form of electrode shown a welding together of the parts in a spot is effected and when this type of welding is employed, the process is repeated any desired number of times along the plates 1 and 2 to join the parts at any multiplicity of points 15 desired.

After welding the spacing member 9 to the plates 1 and 2 the space within the U-shaped spacing member is filled with a mass of material 12 flush with the free edges so as to attain a flush edge along the door. The material 12 may be fiber, cement, a block of metal or any other desired material inserted in a plastic state or properly formed to shape and then inserted.

Either before or after the material 12 is inserted the edges of the plates 1 and 2 are bent over to form flanges 13 which engage the surface of the material 12 and hold it securely in the U-shaped member 9. A flush, solid edge is thus provided for the door which can then have the desired finish applied.

Referring to Fig. 5, instead of the panel plates 6 and 7 terminating at the molding members 4, as shown in Fig. 3, they may be extended into the stile members and terminate in flanges 6' and 7' which bear against the base of the U-shaped spacing member 9. In this case, the flanges 6' and 7' are preferably electrically welded to the strip 9 at a number of points of weld 16 preferably before the stile plates 1 and 2 are welded to the sides of the strip 9, as heretofore described. In this case also the space within the strip 9 and flanges 13 is filled with material as described with regard to the form shown in Fig. 3.

It will be understood that various modifications of the manner of carrying the invention into effect other than the form illustrated and described may be resorted to without departing from the spirit of this invention.

What I claim as my invention is:—

1. In a door or frame construction, opposed stile plates, a U-shaped spacing strip having its sides welded to said plates, a mass of material filling said spacing strip and flanges at the edges of said plates turned over the edges of the spacing strip and engaging the outer surface of said filling material.

2. In a door or frame construction, opposed stile plates, a U-shaped spacing strip having its sides welded to said plates, a mass of material filling said spacing strip and flanges secured to the edges of said plates and folded over the outer surface of said filling material to hold the same in said spacing strip.

Signed at New York, in the county of New York and State of New York, this 22nd day of October, A. D. 1913.

MAURICE LACHMAN.

Witnesses:
F. B. TOWNSEND,
HENRY A. GENS.